(12) United States Patent
Classen

(10) Patent No.: US 11,073,534 B2
(45) Date of Patent: Jul. 27, 2021

(54) COMPONENT INCLUDING AN OPTIMIZED MULTILAYER TORSION SPRING

(71) Applicant: Robert Bosch GmbH, Stuttgart (DE)

(72) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 16/713,443

(22) Filed: Dec. 13, 2019

(65) Prior Publication Data

US 2020/0200793 A1    Jun. 25, 2020

(30) Foreign Application Priority Data

Dec. 20, 2018   (DE) .......................... 102018222615.6

(51) Int. Cl.
*G01P 15/08* (2006.01)
*G01P 15/125* (2006.01)
*F16F 3/02* (2006.01)

(52) U.S. Cl.
CPC ............. *G01P 15/125* (2013.01); *F16F 3/02* (2013.01); *G01P 15/0802* (2013.01); *F16F 2226/04* (2013.01); *G01P 2015/0831* (2013.01)

(58) Field of Classification Search
CPC ............. G01P 15/0802; G01P 15/125; G01P 2015/0831; F16F 3/02; F16F 2226/04
See application file for complete search history.

(56) References Cited

U.S. PATENT DOCUMENTS

| 9,997,984 | B2 * | 6/2018 | Fujimoto | G02B 26/085 |
| 10,739,373 | B2 * | 8/2020 | Koster | G01P 15/08 |
| 2003/0223677 | A1 | 12/2003 | Wendland | |
| 2004/0114259 | A1 | 6/2004 | Ishizuya et al. | |
| 2006/0277997 | A1 * | 12/2006 | Foster | G01P 15/18 73/514.32 |
| 2010/0067083 | A1 * | 3/2010 | Tsuboi | G01C 19/5719 359/221.2 |
| 2010/0107762 | A1 * | 5/2010 | Classen | G01P 15/125 73/514.24 |
| 2010/0186508 | A1 * | 7/2010 | Guenther | G01P 15/125 73/504.14 |
| 2011/0048131 | A1 * | 3/2011 | Reinmuth | G01P 15/125 73/504.12 |
| 2012/0031186 | A1 * | 2/2012 | Classen | G01P 15/08 73/514.32 |
| 2012/0186346 | A1 * | 7/2012 | McNeil | G01P 15/125 73/514.32 |

(Continued)

FOREIGN PATENT DOCUMENTS

| DE | 102009002701 A1 | 12/2010 |
| DE | 102010038809 A1 | 2/2012 |

(Continued)

*Primary Examiner* — David J Bolduc
(74) *Attorney, Agent, or Firm* — Norton Rose Fulbright US LLP; Gerard Messina

(57) ABSTRACT

A component is described, in particular an inertial sensor for detecting acceleration forces, including a substrate, a mass structure, and a spring unit, the mass structure being pivotable along an axis in relation to the substrate with the aid of the spring unit, the spring unit including a first spring web and a second spring web, which are spaced apart from one another along a z direction. Furthermore, a method for manufacturing a spring unit is described.

15 Claims, 8 Drawing Sheets

(56) References Cited

U.S. PATENT DOCUMENTS

| | | | | |
|---|---|---|---|---|
| 2012/0297879 A1* | 11/2012 | Ullrich | .................. | G01P 15/125 |
| | | | | 73/514.32 |
| 2014/0216156 A1* | 8/2014 | Sakai | .................... | G01P 15/125 |
| | | | | 73/514.32 |
| 2015/0053002 A1* | 2/2015 | Ullrich | .................. | G01P 15/125 |
| | | | | 73/514.15 |
| 2015/0203346 A1* | 7/2015 | Fujimoto | ............. | G02B 26/085 |
| | | | | 74/1 SS |
| 2016/0047839 A1* | 2/2016 | Tanaka | .................. | G01P 15/125 |
| | | | | 73/514.32 |
| 2016/0054353 A1* | 2/2016 | Tanaka | .................. | G01P 15/125 |
| | | | | 73/514.32 |
| 2016/0349286 A1* | 12/2016 | Ullrich | .................. | G01P 15/125 |
| 2017/0341927 A1* | 11/2017 | Pekka Herzogenrath | .................. | |
| | | | | G01C 19/5656 |
| 2018/0275162 A1* | 9/2018 | Tanaka | ................. | G01C 21/005 |
| 2019/0135612 A1* | 5/2019 | Boessendoerfer | .... | B81B 3/0051 |
| 2019/0162752 A1* | 5/2019 | Isobe | ..................... | G01H 11/06 |

FOREIGN PATENT DOCUMENTS

| | | |
|---|---|---|
| DE | 102016125722 A1 | 7/2017 |
| EP | 0244581 A1 | 11/1987 |
| EP | 0773443 A1 | 5/1997 |

\* cited by examiner

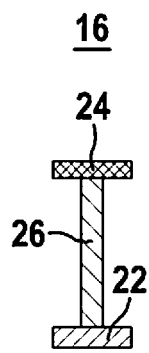
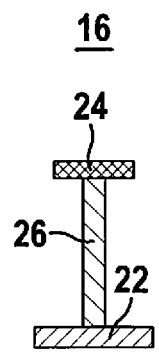
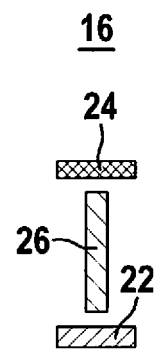
Fig. 5         Fig. 6         Fig. 7
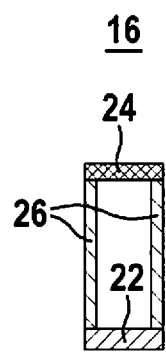
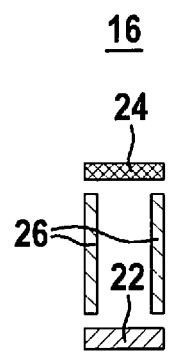
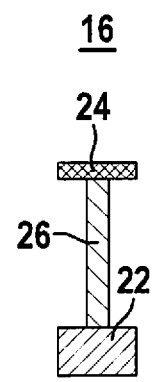
Fig. 8         Fig. 9         Fig. 10
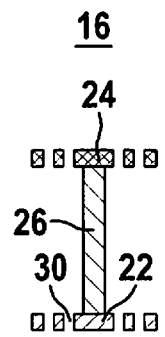
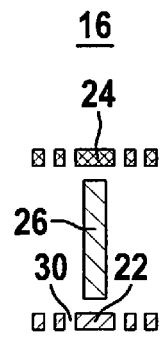
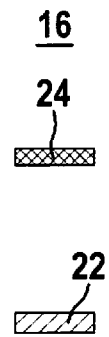
Fig. 11        Fig. 12        Fig. 13

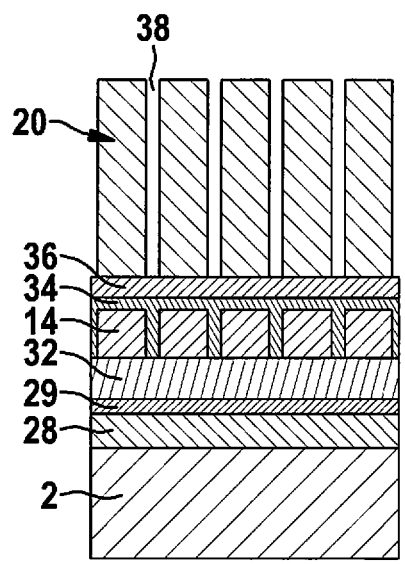
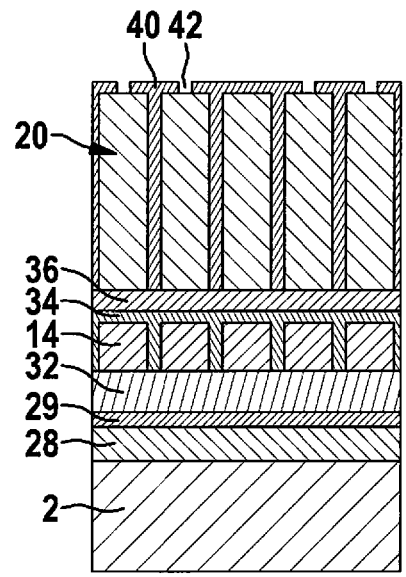
Fig. 18　　　　　　Fig. 19
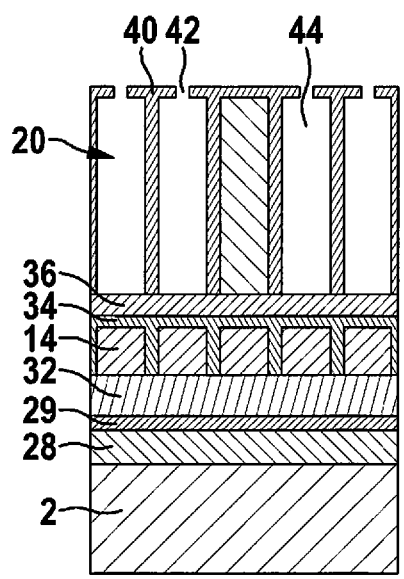
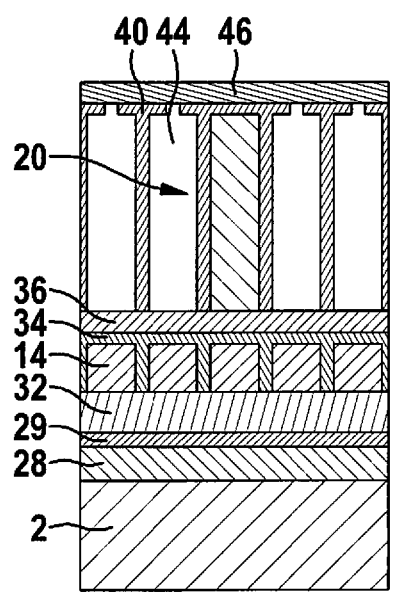
Fig. 20　　　　　　Fig. 21

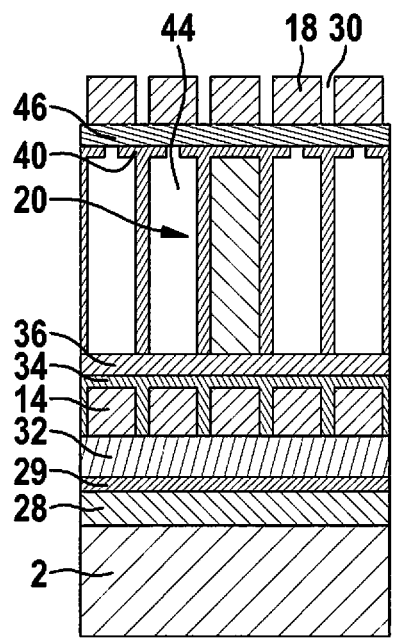
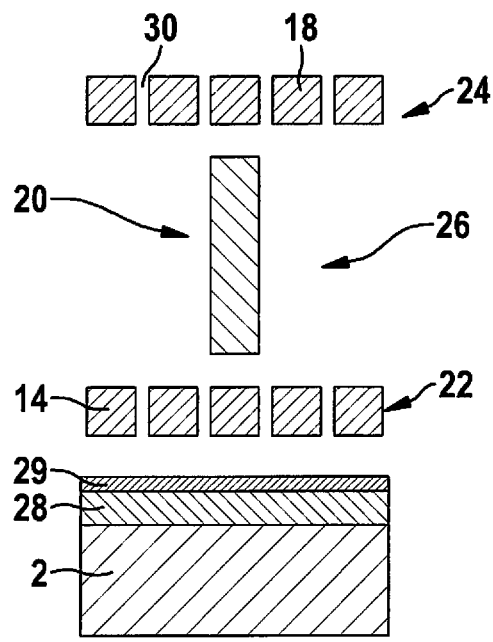
Fig. 22
Fig. 23

COMPONENT INCLUDING AN OPTIMIZED MULTILAYER TORSION SPRING

CROSS REFERENCE

The present application claims the benefit under 35 U.S.C. § 119 of German Patent Application No. DE 102018222615.6 filed on Dec. 20, 2018, which is expressly incorporated herein by reference in its entirety.

FIELD

The present invention relates to a component for detecting acceleration forces, including a substrate, a mass structure, and a spring unit. Furthermore, the present invention relates to a method for manufacturing a spring unit, in particular for a component.

BACKGROUND INFORMATION

Conventional micromechanical inertial sensors for measuring acceleration and rotation rates are used for various applications, for example, in the automotive and consumer fields. Rocker structures are typically used for capacitive acceleration sensors including a detection direction perpendicular to the planar extension of a substrate. The sensor principle of such rocker structures is based on a spring-mass system, in which a movable mass including two counter electrodes fixed on the substrate forms two plate capacitors. The mass is connected via a torsion spring to the underlying surface or the substrate. If the mass distribution of the mass structure differs on the two sides of the torsion spring, the mass structure will thus rotate in relation to the torsion spring as the axis of rotation upon the impact of a z acceleration. In this way, the distance of the electrodes becomes smaller on one side and larger on an opposing side. The resulting capacitance change is a measure of the impacting acceleration. Such acceleration sensors are described, for example, in European Patent Nos. EP 0 244 581 B1 and EP 0 773 443 B1.

Acceleration sensors are preferably to have the lowest possible lateral sensitivity to accelerations in the non-sensitive directions. Furthermore, the sensors are to have the best possible suppression of interfering excitations due to high-frequency vibrations outside a useful band.

The signal errors induced by vibrations are often referred to as VRE (vibration rectification errors). One possible cause for the VRE is the mechanical impact of the mass structure on the fixed stops enclosing the mass structure. In particular, for excitations in parallel to the chip surface, so-called in-plane excitations, these may occur with relatively small interfering accelerations depending on the design of the sensor. In addition to a direction-dependent damping of differing strength of the oscillating mass structure, this may be attributed to the gas enclosed in the sensor in the form of the torsion spring. Torsion springs including an I-shaped profile are often used, which are not only yielding in the direction of the desired torsional movement, but rather are also relatively easily deformable in the direction of an excitation parallel to the substrate surface.

SUMMARY

An object underlying the present invention includes that of providing a method for producing a torsion spring and a component, which includes an improved spring unit, which is yielding with respect to torsion and stiff with respect to bending loads and has a technically simply settable spring pivot point along a z coordinate.

This object may be achieved with the aid of the present invention. Advantageous embodiments of the present invention are described herein.

According to one aspect of the present invention, an example component is provided, in particular an inertial sensor for detecting acceleration forces. The component may preferably be a micromechanical component. The component includes a substrate, a mass structure, and a spring unit, the mass structure being pivotable with the aid of the spring unit along an axis in relation to the substrate. The spring unit includes a first spring web and a second spring web, which are spaced apart from one another along a z direction.

According to a further aspect of the present invention, an example method is provided for producing a spring unit, in particular for a component. In one step, a wafer-shaped substrate is provided, at least one first oxide layer being applied to a front side of the substrate. A polysilicon layer and/or a second oxide layer may optionally also be applied to the substrate. A first layer section for forming a first spring web is deposited indirectly or directly on the first oxide layer. Subsequently, at least one third oxide layer is deposited on the first layer section. A third layer section is deposited on the second oxide layer. According to one optional specific embodiment of the method, at least one third spring web may be formed in this case by material removal of the layer section with the aid of a supporting structure. A further oxide layer is applied to the supporting structure. A second layer section for forming a second spring web is deposited on the further oxide layer. Subsequently, the deposited oxide layers are at least in areas removed by oxide etching in such a way that the spring unit is formed.

Due to the use of a thin additional functional layer or a second layer section which forms a second spring web, a spring unit may be provided which has a settable resilience with respect to the torsional movement and a high stiffness in relation to a bending load along the substrate surface. The spring unit may include an optional third layer section in addition to the two layer sections.

By adding the additional functional layer, springs may be constructed in a technically simple manner which are robust with respect to the signal errors induced by vibrations. In particular, a spring unit having a cross-sectional profile may be implemented, which may replace typical T-shaped or I-shaped profiles. In particular, spring units having an H-shaped or an O-shaped cross-sectional profile may be manufactured by the method.

In addition, the spring units may be formed in various specific embodiments and may be intentionally adapted to the design requirements of the sensor, which result, for example, from complex mass distributions of the movable sensor structures or the mass structure.

Furthermore, the spring unit may be designed in such a way that its z coordinate of the torsional axis of the spring pivot point may be set flexibly. Such a setting is advantageous to reduce a lateral sensitivity with respect to x acceleration in a z acceleration sensor having complex mass distribution.

According to one specific embodiment of the present invention, the component includes a mass structure having at least two masses connected to one another via connecting walls and an anchor situated on the substrate. At least one connecting wall of the mass structure is connected via the spring unit to the anchor and is made pivotable along the axis. According to another advantageous design, the mass structure has an asymmetrical mass distribution in relation to the axis.

According to one specific embodiment of the present invention, the spring unit includes two sections which each connect one connecting wall of the mass structure on both sides to the anchor. The anchor may preferably extend in the z direction from the substrate. The sections of the spring unit may be connected to the anchor on at least two sides of the anchor and may extend, for example, in the x direction or y direction. The sections may each be coupled to a connecting wall of the mass structure on the side of the particular sections opposite to the anchor. The masses of the mass structure may thus be pivotably fastened on the substrate anchor via the connecting walls with the aid of the sections of the spring unit. The spring webs are preferably situated in each section of the spring unit. The spring webs may be formed differently in the particular sections.

According to another specific embodiment of the present invention, the first spring web and the second spring web are aligned parallel to the substrate surface in an initial position of the spring unit. The first and the second spring web may be designed as plate-shaped and may extend in parallel to the substrate surface. The first and the second spring web may be shaped identically or differently in this case. Such an arrangement of the first and the second spring web is used for stiffening the spring unit and thus reduces a bending capability of the spring unit along the substrate surface.

According to another specific embodiment of the present invention, the spring unit includes at least one third spring web aligned in the z direction.

The torsion spring arrangement for a micromechanical structure or a sensor may thus be formed from at least three micromechanical layers. Due to the at least one third spring web, a spring unit having an H-shaped or O-shaped cross-sectional profile may be provided. In particular, the properties of the spring unit may be controlled more precisely by the at least one third spring web. The third spring web may preferably be aligned perpendicularly to the first and the second spring web, whereby an additional mechanical reinforcement of the spring unit is producible.

According to another design, the first spring web, the second spring web, and the at least one third spring web are designed in the form of layers as layer sections. In this way, the particular spring webs may be manufactured precisely by semiconductor processes in at least one section of the spring unit.

According to another specific embodiment of the present invention, the third spring web is connected to the first spring web and/or to the second spring web or is spaced apart from at least one of the spring webs in the z direction. In this way, a mechanical stiffening of the spring unit may be implemented, which is settable in dependence on requirements of the sensor. The mechanical structure of the spring unit includes, for example, a higher torsional stiffness if the at least one third spring web is connected at the ends to the first and the second spring web in the z direction.

According to another specific embodiment of the present invention, the first spring web and the second spring web have a material thickness which is less than a material thickness of the at least one third spring web. According to yet another specific embodiment, the first spring web has a greater material thickness than the second spring web and/or has a greater width than the second spring web. Alternatively, the dimensions of the spring webs may also be designed inversely thereto. In particular, the first spring web may have a lesser material thickness than the second spring web and/or may have a lesser width than the second spring web. As a further advantage, the spring structures may result in lesser rough offsets (i.e., parasitic pre-deflections due to intrinsic inhomogeneous material tensions), since the first and second spring webs formed as polysilicon layers are grown in very fine-crystalline form due to their low layer thicknesses. In this way, the spring webs have lesser intrinsic material tensions than spring webs having greater material thicknesses, for example, the third spring web formable in a coarse-grained manner. Lesser rough offsets may result in improved temperature behavior, the so-called temperature coefficient of offset, in z acceleration sensors and may thus reduce the sensitivity to a so-called package stress, which may result due to different materials of the sensor.

According to another exemplary embodiment of the present invention, the first spring web and/or the second spring web include a perforated structure in areas. The torsional stiffness and the elasticity of the spring unit may be intentionally influenced by the targeted introduction of perforation holes. Moreover, the perforation holes may facilitate the manufacturing method, since sacrificial oxides may thus be removed more easily in the area of the spring unit.

According to another specific embodiment of the present invention, the width of the first spring web and the second spring web is greater than a width of the at least one third spring web. In particular, the width of the first and second spring web may significantly exceed a width of the third spring web, whereby an at least two-dimensional mechanical reinforcement of the structure of the spring unit is producible.

According to another specific embodiment of the present invention, the spring unit is designed in such a way that a z coordinate of the pivot axis of the spring unit forms a pivot axis of the mass structure at the same time. In this way, the lateral sensitivity of the component designed as a z acceleration sensor may be reduced.

According to another specific embodiment of the present invention, at least one of the spring webs is manufactured from a polycrystalline silicon. Small layer thicknesses may be implemented in this way, since polycrystalline silicon may be grown in a fine-crystalline manner. Furthermore, intrinsic material tensions in the spring unit may be reduced.

According to another specific embodiment of the present invention, the first layer section is structured and through the structure of the first layer section is closed by the deposition of the third oxide layer. In this way, a targeted masking for forming one or multiple third spring web(s) may be implemented.

The third spring webs extend in an oblong form in the z direction between the first spring web and the second spring web, whereby the spring unit may be manufactured having an H-shaped or O-shaped cross-sectional profile.

Preferred exemplary embodiments of the present invention are explained in greater detail below on the basis of greatly simplified schematic figures.

BRIEF DESCRIPTION OF THE DRAWINGS

FIGS. 5 through 13 show schematic sectional views of spring units.

FIGS. 14 through 23 show schematic sectional views to illustrate a method for manufacturing a spring unit according to one specific embodiment.

DETAILED DESCRIPTION OF EXAMPLE EMBODIMENTS

Figure 1:
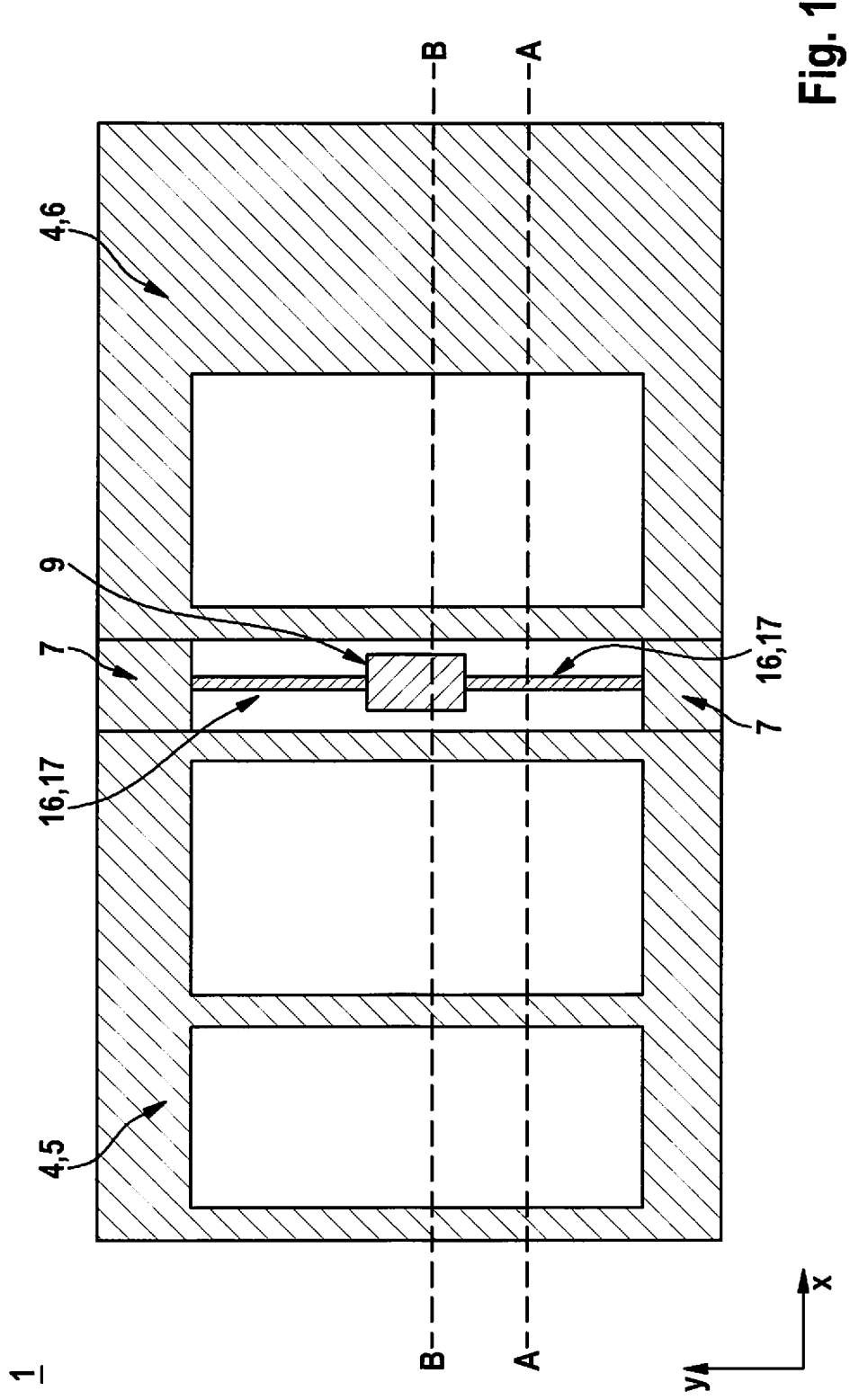
FIG. 1 shows a schematic top view onto an inertial sensor according to one specific embodiment.

FIG. 1 shows a top view onto a component 1, which is designed as an inertial sensor. In particular, it is illustrated that sensor 1 includes a mass structure 4 having two masses 5, 6.

First mass 5 is designed to be hollow and thus lighter than second mass 6. Masses 5, 6 are connected to one another via lateral connecting walls 7. An anchor 9 is situated between connecting walls 7 and the two masses 5, 6. Anchor 9 extends like a column in the z direction and is connected to a substrate 2. Connecting walls 7 are pivotably connected to anchor 9 via sections 17 of a spring unit 16. According to the exemplary embodiment, sections 17 are designed to be identical.

Figure 2:
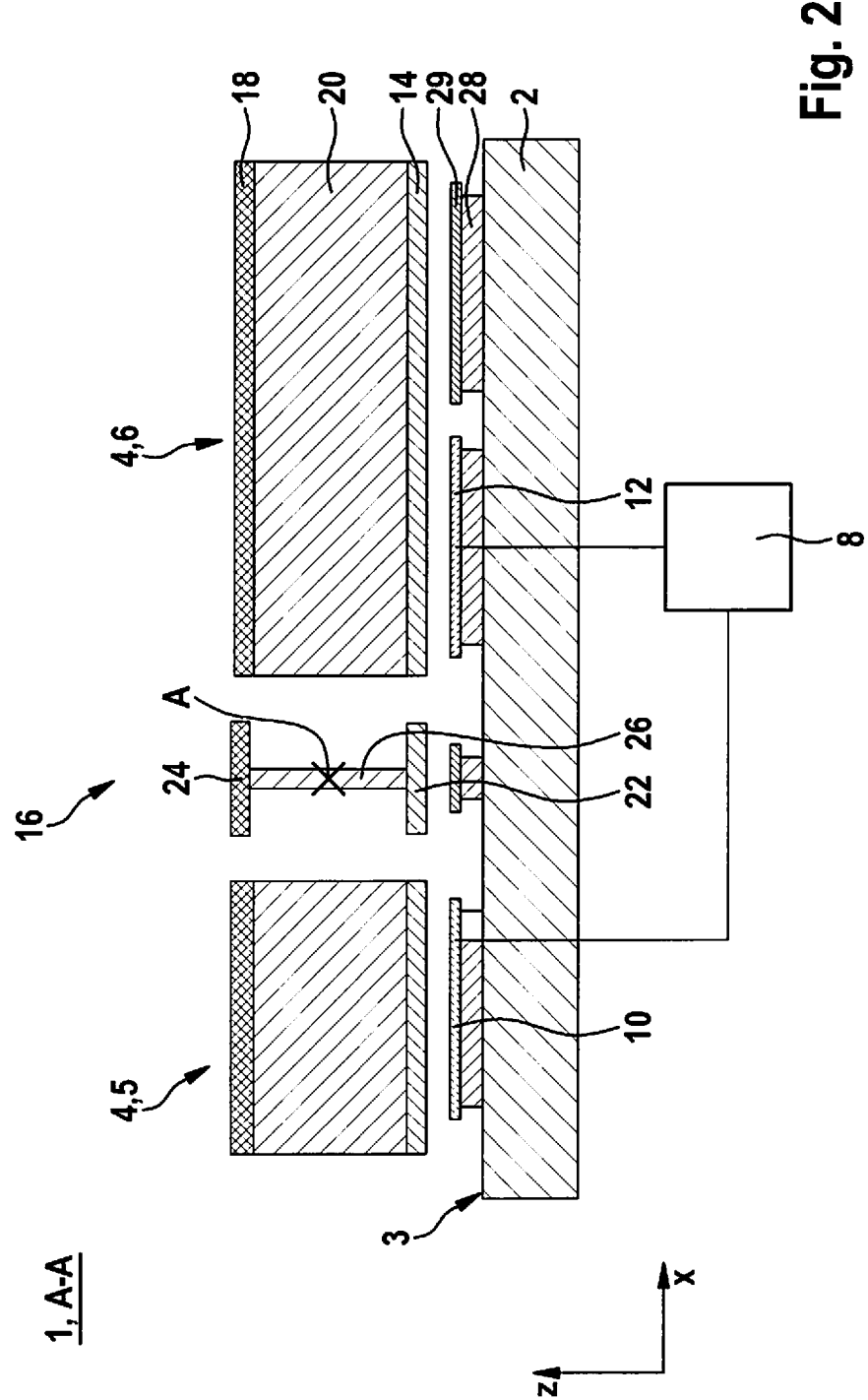
FIG. 2 shows a schematic sectional view of an inertial sensor according to one specific embodiment.

FIG. 2 shows a schematic sectional view of an inertial sensor 1 according to one specific embodiment. In particular, the internal arrangement of sensor 1 is shown, which includes the functional components.

Inertial sensor 1 is used for detecting acceleration forces acting in the z direction. Sensor 1 includes a substrate 2, a mass structure 4 including two different masses 5, 6 and a detection unit 8.

Detection unit 8 is electrically conductively connected to electrodes 10, 12 and may ascertain the capacitance between electrodes 10, 12 and a lower layer 14 of mass structure 4. The movement of mass structure 4 in relation to substrate 2 may be detected in this way.

Furthermore, sensor 1 includes a spring unit 16. Spring unit 16 is designed as a torsion spring. Mass structure 4 is pivotably connected to substrate 2 along an axis A situated in parallel to a substrate surface 3 with the aid of spring unit 16.

Masses 5, 6 of mass structure 4 are situated on two opposing sides of spring unit 16 and have different weights.

Spring unit 16 includes three layer sections 14, 18, 20, which form a first spring web 22, a second spring web 24, and a third spring web 26, according to the exemplary embodiment.

Spring webs 22, 24, 26 form a spring unit 16, which includes an H-shaped cross-sectional profile. For this purpose, first and second spring webs 22, 24 are situated in parallel to one another and in parallel to substrate surface 3. In particular, spring webs 22, 24 are spaced apart from one another in the z direction by a third spring web 26 aligned perpendicularly to substrate surface 3 and are connected to one another via third spring web 26.

A relatively low torsional stiffness for the useful movement of the rocker or mass structure 4 is maintained by this arrangement, spring unit 16 having an increased bending stiffness in relation to a simple "I-spring." Since moreover a spring pivot point and a mass center of gravity of movable structure 4 coincide with respect to their z coordinate, no lateral sensitivity with respect to the x direction also occurs in this arrangement.

Electrodes 10, 12 are positioned on an oxide layer 28, which is situated on substrate surface 3, and are formed by a polycrystalline silicon layer 29.

Figure 3:
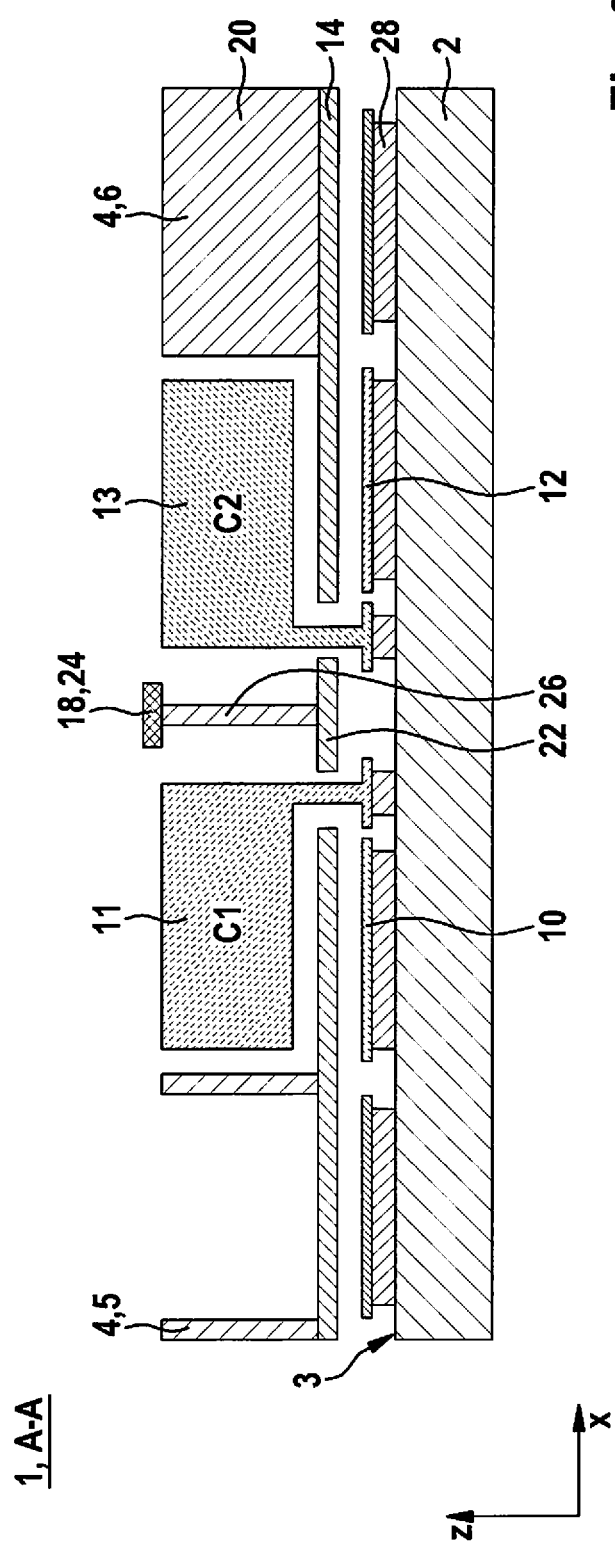
FIG. 3 shows a schematic sectional view of an inertial sensor according to another specific embodiment along a section plane A-A from FIG. 1.

FIG. 3 shows a schematic sectional view of an inertial sensor 1 according to another specific embodiment. In contrast to the sensor shown in FIG. 1, inertial sensor 1 has a differential electrode principle having a top electrode 11, 13 and a bottom electrode 10, 12 in each case. For the sake of clarity, the electrical connection of electrodes 10, 11, 12, 13 to detection unit 8 is not shown.

The geometry of spring unit 16 is designed in such a way that first spring web 22 has a greater width than second spring web 24.

The mass center of gravity of movable mass structure 4 is lower for this sensor topology. The spring pivot point thus also has to be positioned somewhat lower than in FIG. 1 to eliminate the lateral sensitivity with respect to the x acceleration. This is achieved in that the width of first spring web 22 is greater than that of second spring web 24. A favorable combination of high bending stiffness of spring unit 16 and vanishing lateral sensitivity of sensor 1 may thus also be achieved in this case.

Figure 4:
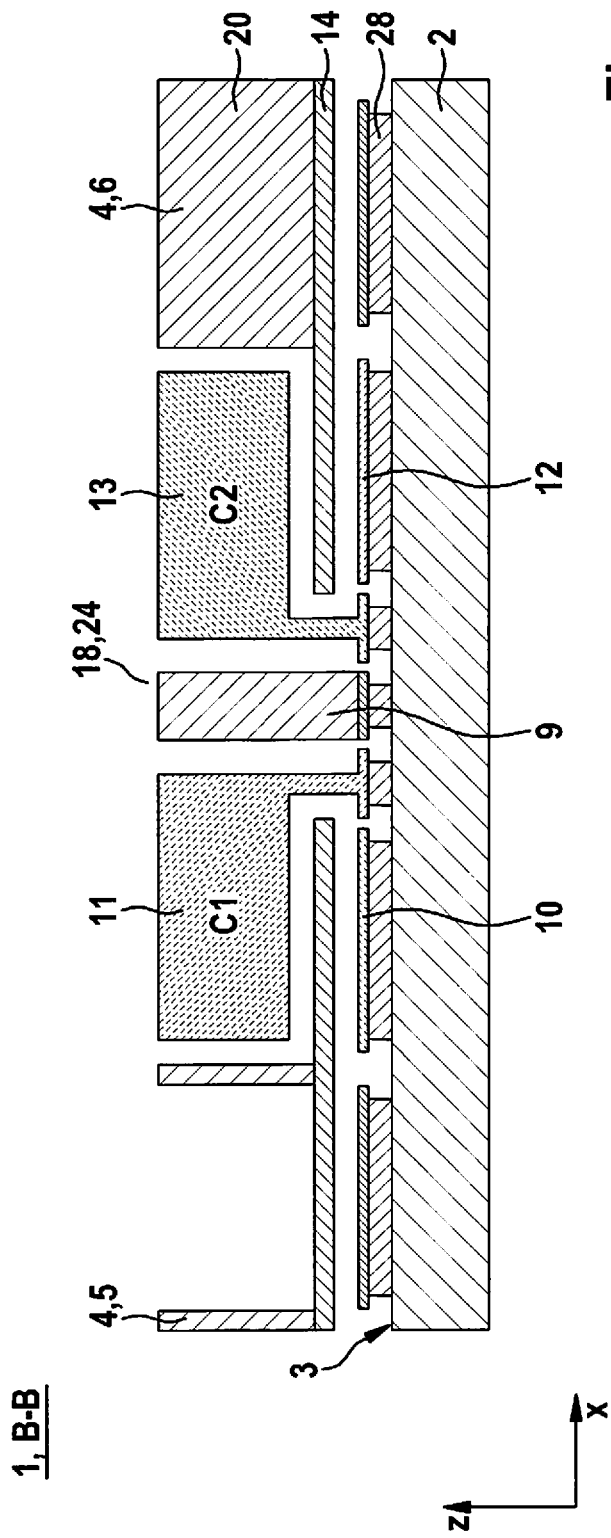
FIG. 4 shows a schematic sectional view of the inertial sensor from FIG. 3 along a section plane B-B from FIG. 1.

FIG. 4 shows a schematic sectional view of inertial sensor 1 from FIG. 3 along a section plane B-B from FIG. 1. In particular, the shape of anchor 9 is illustrated, which extends from substrate 2 in the form of a column in the z direction and is used as a receptacle of sections 17 of spring unit 16.

Layer sections 14, 18, 20 may extend through anchor 9 or may be integrally joined laterally to anchor 9. According to the exemplary embodiment, first layer section 14 and second layer section 18 do not extend through anchor 9, but rather are coupled flush in the y direction with anchor 9.

FIGS. 5 through 13 show schematic sectional views of spring units 16 according to specific embodiments according to the present invention. In particular, possible cross-sectional profiles of spring unit 16 are shown. The possible shaping of the cross-sectional profiles is not restricted to the examples shown, but rather may include different variations and combinations.

FIG. 5 shows the cross-sectional profile of a spring arrangement 16 from FIG. 1. The cross-sectional profile of spring arrangement 16 from FIG. 2 is shown in FIG. 6.

FIG. 7 shows an H-spring arrangement, in which first spring web 22 and second spring web 24 are spaced apart from one another in the z direction. Third spring web 26 is not connected directly to spring webs 22, 24, but rather is spaced apart in areas from spring webs 22, 24.

FIG. 8 shows a spring unit 16, which is designed as a so-called "O-spring." In contrast to the preceding exemplary embodiments, this spring unit includes two third spring webs 26, which are spaced apart from one another in the x direction. The two third spring webs 26 are directly connected in the z direction to first and second spring webs 22, 24. In this way, the bending stiffness of the arrangement is increased even more strongly than the torsional stiffness.

FIG. 9 shows an O-spring arrangement in which first spring web 22 and second spring web 24 are spaced apart from the two third spring webs 26 in the z direction. Spring webs 22, 24, 26 may be in areas or completely connected or spaced apart from one another.

FIG. 10 shows an H-spring arrangement in which not the width, but rather the thickness of first spring web 22 was increased. Of course, torsional stiffness, bending stiffness, and location of the spring pivot point may also be influenced by thickness variations. Such an adaptation of the thickness or material thickness may also be implemented on second spring web 24 and at least one third spring web 26. Alternatively, second spring web 24 may also be formed having a greater thickness than first spring web 22.

FIGS. 11 and 12 show a spring unit 16 designed as an H-spring including individual perforation holes or slots in first and second spring webs 22, 24. These perforation holes 30 may be necessary to facilitate the removal of sacrificial oxides during the exposure of the micromechanical structure.

FIG. 13 shows a spring unit 16, in which the torsion spring is solely still formed by first spring web 22 and second spring web 24. Such a spring unit 16 is particularly advantageous with respect to a rough offset of sensor 1, since the thin spring webs 22, 24 grow in fine-crystalline manner and therefore have minimal intrinsic tensions. In this way, the stiffness of spring unit 16 with respect to z bending may be set in a reducing manner.

FIGS. 14 through 23 show schematic sectional views to illustrate a method for manufacturing a spring unit 16 according to one specific embodiment. A section 17 of spring unit 16 is schematically shown.

The method is shown by way of example on the basis of a surface micromechanical process, in which four polysilicon layers 29, 14, 20, 18 are used. The fundamental method steps for the manufacturing of spring unit 16 are illustrated in FIGS. 14 through 23.

Figure 14:
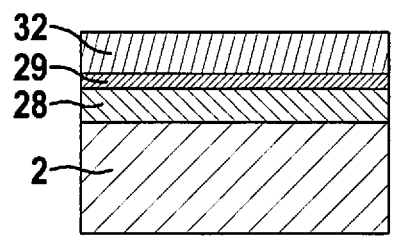

A wafer-shaped substrate 2 including a first oxide layer 28, a polysilicon layer 29 for forming counter electrodes 10, 12, and a second oxide layer 32 are provided in FIG. 14.

Figure 15:
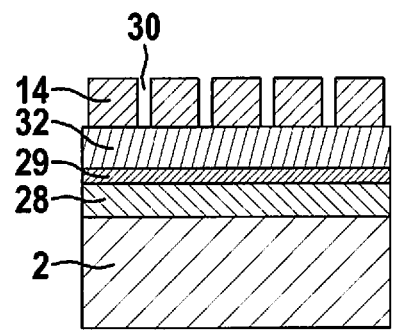

First layer section 14 is deposited on second oxide layer 32 and structured with the aid of fine trenches in FIG. 15. The trenches form perforation holes 30. First spring web 22 of spring unit 16 is formed by first layer section 14.

Figure 16:
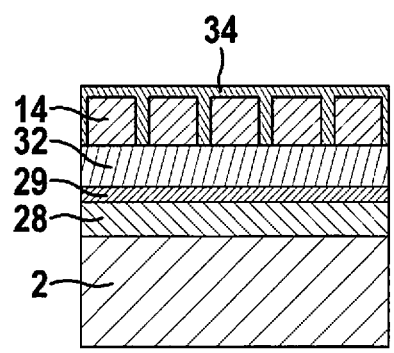

FIG. 16 shows how a third oxide layer 34 is deposited. Perforation holes 30 are temporarily closed in this way. Further process steps may be carried out, which are relevant for the formation of mass structure 4. However, these process steps do not relate to the manufacturing of spring unit 16. Furthermore, third oxide layer 34 may be in areas opened to introduce fine slots into first layer section 14 in an etching method, for example, using SF6 or XeF2. Oxide layer 34 is used in this case as a mask.

Figure 17:
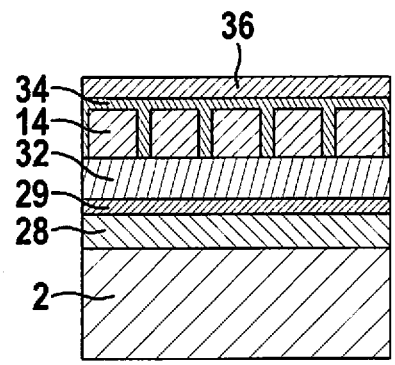

A fourth oxide layer 36 is deposited on third oxide layer 34 in FIG. 17. In this way, irregularities may be compensated for or openings functioning as a mask may be closed again. Broad areas of first layer section 14 may be cleared out in this way without leaving behind noticeable topography on the surface of the fourth oxide layer.

FIG. 18 shows how third layer section 20 for forming at least one third spring web 26 is deposited and subsequently structured by fine trenches 38.

A further oxide layer 40 is deposited in FIG. 19. In this case, trenches 38 are filled and a level surface is formed. Subsequently, openings 42 may be introduced into oxide layer 40 to remove unneeded sections 44 of third layer section 20.

Unneeded sections 44 are removed via openings 42 in fifth oxide layer 40 using a further etching step, shown in FIG. 20, which may be carried out by isotropic material removal. Unneeded sections 44 of third layer section 20 are used here as sacrificial silicon areas.

A further oxide layer 46 is applied to the structure in FIG. 21, whereby openings 42 of fifth oxide layer 40 are closed.

Subsequently, second layer section 18 may be deposited in a step shown in FIG. 22. Perforation holes 30 in the form of trenches may be introduced here in a structuring step.

Subsequently, oxide layers 28, 32, 34, 36, 40, 46 may be at least sectionally removed from the structure by oxide etching, whereby spring unit 16 is finished. The oxide etching is preferably carried out using gaseous HF.

A spring unit 16, which is also shown in FIG. 12, is formed in FIGS. 14 through 23. The other spring units shown by way of example in FIGS. 5 through 13 may be manufactured similarly by the method.

Although the described exemplary embodiments relate by way of example to an inertial sensor for measuring acceleration in the z direction, the spring arrangements according to the present invention and the manufacturing method may thus also be used for further micromechanical components such as micromirrors, resonators, rotation rate sensors, Lorentz magnetometers, and the like.

What is claimed is:

1. A component, comprising:
    a substrate;
    a mass structure; and
    a spring unit, the mass structure being pivotable in relation to the substrate along an axis using the spring unit, wherein the spring unit includes a first spring web and a second spring web, which are spaced apart from one another along a z direction,
    wherein the first spring web and the second spring web form a spring unit which includes an H-shaped cross-sectional profile such that the first spring web and the second spring web are situated in parallel to one another and in parallel to the substrate, and the first spring web and the second spring web are connected to one another and spaced apart from one another in the z direction by a third spring web aligned perpendicularly to the substrate.

2. The component as recited in claim 1, wherein the component is an inertial sensor for detecting acceleration forces.

3. The component as recited in claim 1, wherein the mass structure includes at least two masses connected to one another via connecting walls and wherein the component further comprises:
    an anchor situated on the substrate, at least one of the connecting walls of the mass structure being connected using the spring unit to the anchor and being pivotable along the axis, the mass structure having an asymmetrical mass distribution in relation to the axis.

4. The component as recited in claim 3, wherein the spring unit includes two sections, which each connect one of the connecting walls of the mass structure on both sides to the anchor.

5. The component as recited in claim 1, wherein the first spring web and the second spring web are aligned in parallel to the substrate surface in an initial position of the spring unit.

6. The component as recited in claim 1, wherein the spring unit includes at least one third spring web aligned in the z direction.

7. The component as recited in claim 6, wherein the first spring web and/or the second spring web and/or the at least one third spring web is configured in the form of layers as layer sections.

8. The component as recited in claim 6, wherein: (i) the third spring web is connected to the first spring web and/or the third spring web is connected to the second spring web, or (ii) the third spring web is spaced apart from at least one of the first and second spring webs in the z direction.

9. The component as recited in claim 6, wherein the first spring web and/or the second spring web include a material thickness which is less than a material thickness of the at least one third spring web.

10. The component as recited in claim 1, wherein: (i) the first spring web includes a greater material thickness than the second spring web and/or the first spring web includes a greater width than the second spring web, or (ii) the first spring web includes a lesser material thickness than the second spring web and/or the first spring web includes a lesser width than the second spring web.

11. The component as recited in claim 1, wherein the first spring web and/or the second spring web has a perforated structure in areas.

12. A component, comprising:
a substrate;
a mass structure; and
a spring unit, the mass structure being pivotable in relation to the substrate along an axis using the spring unit, wherein the spring unit includes a first spring web and a second spring web, which are spaced apart from one another along a z direction,
wherein the spring unit includes at least one third spring web aligned in the z direction,
wherein a width of the first spring web and the second spring web is greater than a width of the at least one third spring web.

13. The component as recited in claim 1, wherein the spring unit is configured in such a way that a z coordinate of the pivot axis of the spring unit forms a pivot axis of the mass structure at the same time.

14. The component as recited in claim 6, wherein at least one of the first and/or second and/or third spring webs is manufactured from a polycrystalline silicon.

15. A method for manufacturing a spring unit for a component, the method comprising:
providing a wafer-shaped substrate, at least one first oxide layer being applied on a front side of the substrate;
depositing a first layer section indirectly or directly on the first oxide layer to form a first spring web;
depositing at least one third oxide layer on the first layer section;
depositing a third layer section and applying a further oxide layer to the third layer section;
depositing a second layer section on the further oxide layer to form a second spring web; and
removing the deposited oxide layers at least in areas of the third layer section by oxide etching in such a way that the spring unit is formed,
wherein at least one third spring web is formed by material removal of the third layer section, the first layer section being structured and the structure of the first layer section being closed by the deposition of the third oxide layer,
wherein the first spring web and the second spring web form a spring unit which includes an H-shaped cross-sectional profile such that the first spring web and the second spring web are situated in parallel to one another and in parallel to the substrate, and the first spring web and the second spring web are connected to one another and spaced apart from one another in the z direction by the third spring web aligned perpendicularly to the substrate.

\* \* \* \* \*